United States Patent [19]

O'Dell

[11] 3,736,765

[45] June 5, 1973

[54] APPLIANCE INCLUDING ELECTRIC DIAGNOSIS MEANS

[75] Inventor: George B. O'Dell, Louisville, Ky.

[73] Assignee: General Electric Company, Louisville, Ky.

[22] Filed: Jan. 5, 1972

[21] Appl. No.: 215,575

[52] U.S. Cl. ........................62/127, 62/125, 62/236, 62/237, 340/416, 340/253

[51] Int. Cl. ..............................................F25b 49/00

[58] Field of Search .......................62/125, 127, 126, 62/236, 237, 262

[56] References Cited

UNITED STATES PATENTS

| | | | |
|---|---|---|---|
| 2,766,439 | 10/1956 | Palm | 62/127 |
| 3,283,525 | 11/1966 | Fricke | 62/236 |
| 3,480,940 | 11/1969 | Lieser | 62/126 |
| 3,553,475 | 1/1971 | Fee | 62/237 |
| 3,564,274 | 2/1971 | Kaltz | 62/236 |
| 3,611,743 | 10/1971 | Manganaro | 62/262 |
| 3,628,346 | 10/1971 | Lagrone | 62/127 |

*Primary Examiner*—William J. Wye
*Attorney*—Walter E. Rule and Francis H. Boas, Jr.

[57] ABSTRACT

A household appliance including a plurality of electrical components is provided with readily accessible multiple circuit connector means for quickly checking and diagnosing the quality and operation of the individual components by means of test equipment adapted to be connected to the appliance through the connector means.

3 Claims, 5 Drawing Figures

APPLIANCE INCLUDING ELECTRIC DIAGNOSIS MEANS

BACKGROUND OF THE INVENTION

In recent years, the number and in some cases the variety of electrical components in household appliances such as dishwashers, clothes washers, ranges and refrigerators have increased to the point where it is becoming increasingly difficult to quality check the appliance in its assembled state to be certain that all of the components are functioning properly or to quickly and accurately diagnose electrical faults in the appliance during the field servicing thereof. The problem of checking the electrical operation of such components either in the factory or in the field is further complicated by the fact that many of the components, in order to perform their desired functions, are disposed in relatively inaccessible portions of the housing or cabinet structure forming part of the appliance. As a result, both the factory quality testing and field servicing of modern appliances have become expensive and time consuming procedures. In addition, since all of the components are electrically connected to the same supply leads, it may be impossible to check the electrical operation of an individual component without completely cutting the leads connecting that component to the supply lines.

SUMMARY OF THE INVENTION

It is the primary object of the present invention to provide a household appliance comprising a plurality of electrical components with means for quickly and accurately testing the operation of the individual components of the appliance.

Another object of the invention is to provide a household appliance including readily accessible connector means forming part of the appliance circuitry, the connector means being connected into the circuitry in such a manner that the operation of individual circuit components can be quickly checked by means of simple and inexpensive test means.

Additional objects and advantages of the invention will become apparent in the following description of the invention which will be illustrated and described in its application to a household refrigerator as a typical appliance.

In accordance with the illustrated embodiment of the invention, there is provided a household refrigerator cabinet including the usual insulated walls defining one or more storage compartments, a machinery compartment and a refrigeration system including an evaporator for maintaining the storage compartments at the desired refrigerating temperatures and a condensing unit including a compressor mounted within the machinery compartment. Besides the compressor motor, other electrically-operated components connected to a single source of electrical power include a defrost heater for periodically warming the evaporator to defrosting temperatures, a defrost control timer for controlling the operation of the heater, and motor-driven fan means for circulating air over the condenser and/or the evaporator and various wall heaters for maintaining specific wall portions of the cabinet at temperatures above the dew point. By the present invention, the circuitry for testing these various electrical components comprises connector means including a mating plug and receptacle combination containing a plurality of mating terminals or pairs of terminals electrically connected at various points in the control circuitry so that when the connector plug and receptacle are disconnected or separated, selected major components of the refrigerator are isolated from other components for the electrical testing thereof.

In accordance with the further aspects of the present invention, there is provided diagnostic or test equipment having matching plug and receptacle for connection to the appliance plug and receptacle and including a plurality of jack means enabling the control or service technician to make direct electrical connection to each of the isolated components.

DESCRIPTION OF THE PREFERRED EMBODIMENT

Figures 1, 2, 3:
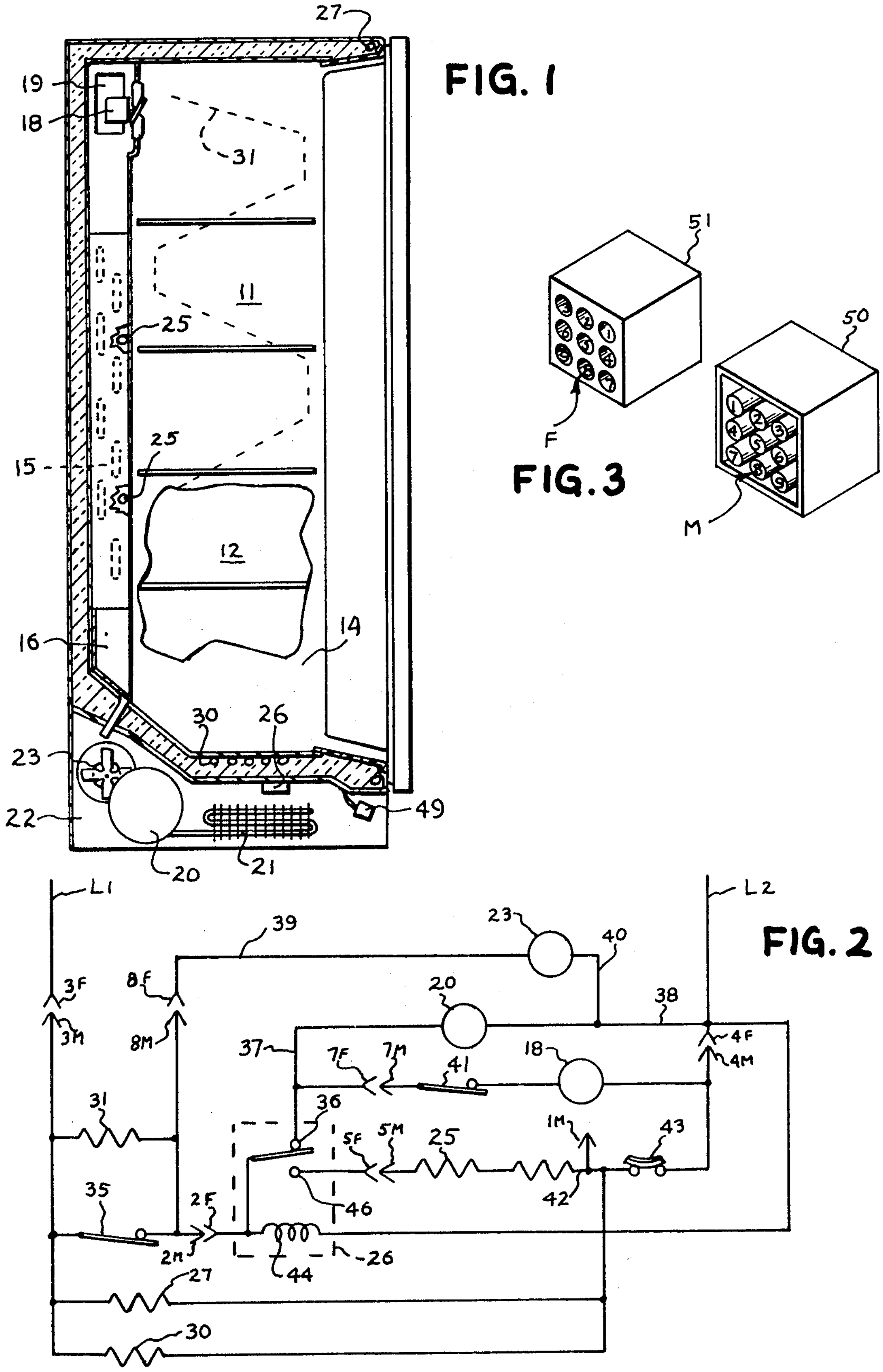
FIG. 1 is a vertical side view, in section, of a side-by-side refrigerator incorporating the present invention.
FIG. 2 is a diagram of the refrigerator control circuitry employing the practice of the present invention.
FIG. 3 is a perspective view of the connector means forming part of the control circuitry.

While the diagnostic means of the present invention is applicable to any household appliance of above described types, it will be particularly described in its application to a refrigerator of the side-by-side type as illustrated in FIG. 1 of the drawing.

The refrigerator cabinet of FIG. 1 includes a freezer compartment 11 and a fresh good compartment 12 arranged in side-by-side relationship and separated by means of a vertical partition 14. An evaporator is contained within an evaporator chamber or housing 16 extending vertically along the rear wall of the freezer compartment 11 and an evaporator fan 18 in the upper portion of the evaporator chamber draws separate air streams from the two compartments through the evaporator chamber and discharges air cooled by the evaporator into the upper portion of the freezer compartment and through a passage 19 into the fresh food compartment 12. The evaporator 15 forms part of a refrigeration system including a compressor 20 and a condenser 21 mounted in the machinery compartment 22 in the lower portion of the cabinet; this machinery compartment also including a condenser fan 23 for circulating cooling air over the compressor and condenser.

Additional major electrical components include one or more defrost heaters 25 for periodically warming the evaporator 15 to defrosting temperatures, a defrost control timer 26, case heaters 27 for maintaining the portions of the cabinet surrounding the cabinet access openings at temperatures above the dew point and a low wattage heater 30 in the bottom wall of the fresh food compartment for counteracting the spillage of the evaporator air into this part of the compartment during compressor off cycles. A partition heater 31, shown in dotted lines in FIG. 1, may be provided to help maintain suitable above-freezing temperatures in the fresh food compartment.

The manner in which these components and other components are electrically connected to supply conductors or lines L1 and L2 is illustrated in FIG. 2 of the drawing. The compressor 20 is connected across lines L1 and L2 through a temperature control thermostat 35 responsive to fresh food compartment temperatures, contact 36 of the defrost control timer 26, conductor 37 and conductor 38. The condenser fan, connected in parallel with the defrost control and the compressor 20, is energized through the thermostat 35 by leads 39 and 40.

The evaporator fan 18 is also connected in parallel with the compressor from refrigeration contact 36 through a normally closed door operated switch 41.

The case heaters 27 and 30 are parallel connected across lines L1 and L2 through line 42 and a defrost termination thermostat 43. The defrost heater 25 is energized through the thermostat 35, defrost contact 46 of the defrost control 26, line 42 and the defrost termination thermostat 43, while the defrost timer motor 44 forming part of the defrost control 26 is connected in parallel with the compressor through the thermostat 35 and is energized whenever the compressor is energized. The partition heater 31 connected across line L1 and lead 39 in parallel with the thermostat 35 is energized whenever the thermostat 35 is open.

It will be understood that the refrigerator may also include additional electrical components such as light switches, an ice maker, etc., the circuitry shown in FIG. 2 being merely illustrative of a control circuitry incorporating inaccessible or substantially inaccessible electrical components.

For quickly and accurately diagnosing the major components of the circuitry, the circuitry in accordance with the present invention includes a multiple terminal connector 49 mounted at an accessible point in the cabinet as, for example, at the front of the machinery compartment 22 as shown in FIG. 1. The connector comprises, as illustrated in FIG. 3 of the drawing, a plug 50 containing a plurality of terminals 1M to 9M and a receptacle 51 including terminals 1F to 9F respectively connectable to the plug terminals to provide a plurality of mating terminal pairs which are connected within the circuitry at points such that when the plug and receptacle are separated individual components or groups of related components are isolated.

For ease of description and illustration, the points at which these pairs of terminals are placed within the circuitry have been indicated by the reference numerals 1–9 with an arrowhead ( → ) indicating the terminals 1M to 9M of the plug 50 and an arrowtail (>—) indicating the terminals 1F to 9F of the receptacle 51. For example, the pair of terminals 2 in the line from the thermostat 35 to the defrost control 26 has the plug terminal 2M ( → ) connected to the thermostat 35 and the receptacle terminal 2F (>—) connected to the defrost control.

The reason for this selective connection insofar as the plug and receptacle terminals will become more apparent from a consideration of suitable test or diagnostic equipment used in diagnosing the circuitry.

Figure 4:
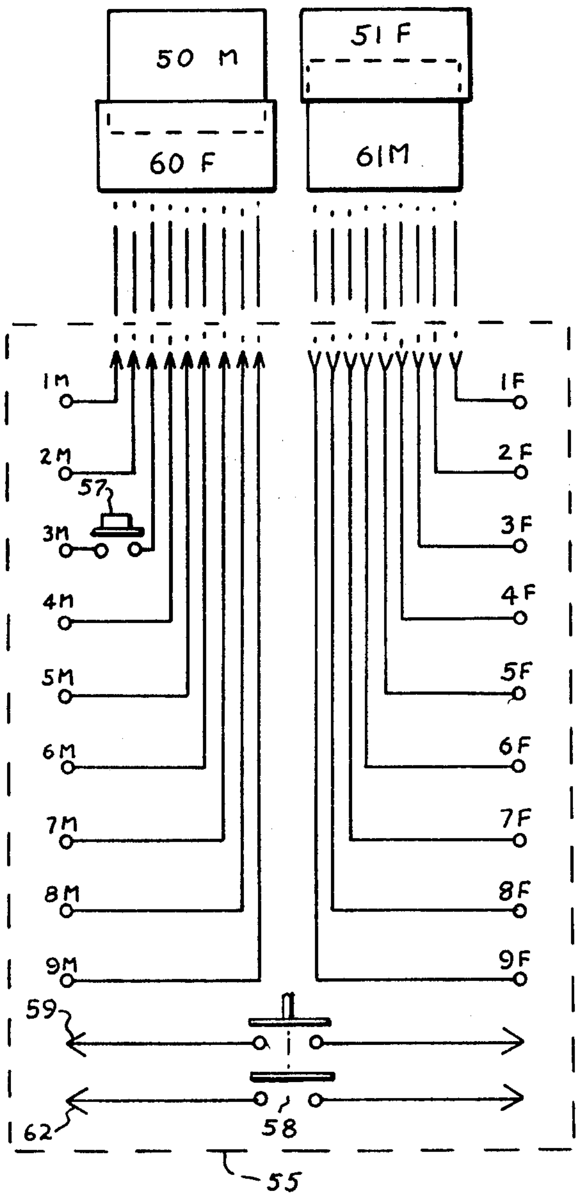
FIG. 4 is a circuit diagram for an evaluation tester employed for quickly checking the individual components of the refrigerator circuitry.

Functionally, the test equipment or box generally indicated by the numeral 55 in FIG. 4 is adapted to extend the test points represented by the terminal pairs 1 to 9 outside the cabinet thereby enabling the quality control or service technician to quickly and accurately diagnose electrical faults. The illustrated test adaptor 55 intended for field servicing comprises a receptacle 60 and a plug 61 having multiple terminals adapted respectively to match or mate with the terminals of plug 50 and receptacle 51 forming part of the cabinet circuitry. The internal wiring of the test box 55 connects the various terminals to corresponding jacks identified in FIG. 4 by the same or corresponding reference numerals for the connector terminals and indicated also by either arrowheads or arrowtails since these jacks are extensions of the corresponding terminals of connector 49 within the appliance circuitry.

The circuitry in the testor 55 also includes a normally open, momentary contact, switch in the lead to 3M for completing a circuit from the potential side of the line that is line L1 to the jack 3, this switch being indicated by the numeral 57 and a second double-pole switch 58 which completes the circuit through the respective jumper wires 59 and 62 used to make complete test circuits through the test box.

In the use of this test means, the connector plug and receptacle 50 and 51 are separated and the test box plug 60 and 61 connected to the plug and receptacle 50 and 51. The service technician is then ready to test various isolated components of the system generally by use of an ordinary ohmmeter.

Figure 5:
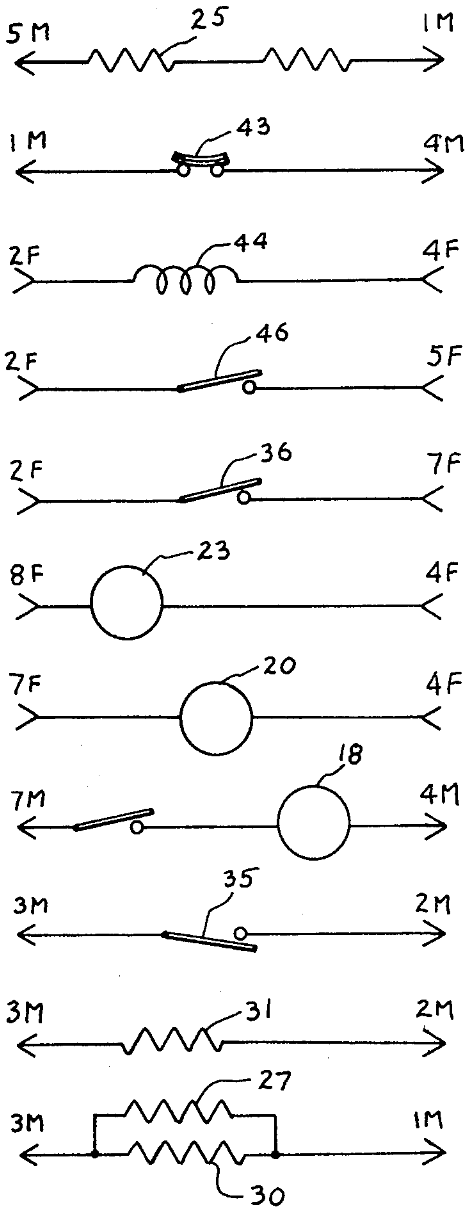
FIG. 5 illustrates examples of circuit portions or components which can be tested by means of the test equipment of FIG. 4.

The specific jacks to be used for testing the resistance values of various components are indicated in FIG. 5 of the drawing, it being understood that for each appliance a chart similar to that shown in FIG. 5 is provided giving the correct resistance values for the component or groups of components and the jacks to be used.

For example, with reference to FIGS. 4 and 5, the resistance of the defrost heater 25 is checked by plugging the ohmmeter probes into jacks 1M and 5M. With the defrost control in the defrost position, the defrost control motor can be checked by jacks 5F and 4F.

For operating the isolated compressor motor, jumper 59 is connected to jacks 3F and 7F and switches 57 and 58 are both closed. If the compressor does not operate, the line voltage can be checked through contacts to jacks 3M and 4M. By bridging contacts 3F and 8F by means of jumper 59, the condenser fan 23 should run when both switches 57 and 58 are closed. Terminal 1 does not break the circuitry but rather provides connection to the circuitry between heaters 25 and 27 and 30 so that by means of terminals 3 or 5 and 4 the individual heaters and the defrost thermostat can be tested.

For the operation of some of the individual components both jumpers are used. For example, for operating the evaporator fan, one jumper is used to connect 3F to 7M and the other to connect 4M to 4F thereby supplying power to the fan directly from power lines L1 and L2.

From these examples, it will be seen that by means of this test adaptor the isolated elements or components can be tested separately and a complete diagnosis of the circuitry and components obtained without unplugging the appliance from the power source.

In the factory testing of assembled refrigerators or other appliances, the same connections are made to the appliance circuitry. For rapid testing, suitable electronic computer equipment is substituted for tester 55 so that all of the tests can be made in a matter of minutes, the results analyzed and any faults indicated either by suitable light indicators or by a printout.

It will be understood therefore that while the invention has been described with reference to a particular appliance and a specific tester means, it is not limited thereto and it is intended by the appended claims to cover all such modifications as fall within the true spirit and scope of the invention.

I claim:

1. A refrigerator cabinet comprising:

insulated walls defining a storage compartment;

a machinery compartment;

a refrigeration system including an evaporator and a compressor, said compressor including a motor component and being disposed in said machinery compartment;

a fan component for circulating air from the storage compartment over said evaporator;

an electrical defrost component for periodically warming said evaporator to defrost temperatures;

an electrical heating component contained in portions of said insulated walls;

circuitry including supply leads for connecting all of said components to a source of electrical power;

separable connector means positioned in an accessible part of said cabinet and having a plurality of mating terminals;

said terminals being connected into said circuitry so that separation thereof individually electrically isolates said components whereby each of said components can be individually tested.

2. The refrigerator of claim 1 in which said connector means is positioned at the front of said machinery compartment.

3. The refrigerator of claim 1 in which said connector means includes terminals in said supply leads.

* * * * *